US006357881B1

(12) United States Patent
Robertson

(10) Patent No.: US 6,357,881 B1
(45) Date of Patent: Mar. 19, 2002

(54) SECURITY SCREEN FOR SELF-SERVICE TERMINALS

(75) Inventor: Clive S. Robertson, Dundee (GB)

(73) Assignee: NCR Corporation, Dayton, OH (US)

(*) Notice: Subject to any disclaimer, the term of this patent is extended or adjusted under 35 U.S.C. 154(b) by 0 days.

(21) Appl. No.: 09/679,587

(22) Filed: Oct. 4, 2000

(51) Int. Cl.[7] .......... G02B 27/00
(52) U.S. Cl. .......... 359/609; 359/601
(58) Field of Search .......... 359/601–615, 359/442, 450, 507, 513, 801–811, 819–820, 827, 894, 892, 896; 235/379–382; 348/834–842

(56) References Cited

U.S. PATENT DOCUMENTS 4,632,511 A * 12/1986 Louw .......... 359/601
4,882,582 A * 11/1989 Oka .......... 341/23
5,134,654 A * 7/1992 McGough .......... 379/428
5,253,829 A * 10/1993 Willey .......... 296/217
5,673,333 A * 9/1997 Johnston .......... 382/137

FOREIGN PATENT DOCUMENTS

EP 0892377 1/1999

* cited by examiner

*Primary Examiner*—Thong Nguyen
(74) *Attorney, Agent, or Firm*—Gergory A. Welte

(57) ABSTRACT

A molded security cover (10) for use with a self-service terminal (SST) is provided, the cover (10) including a translucent recessed portion (14, 16) for location over the SST display screen, and an opaque portion (18) including a number of apertures (12) for location over the function display keys (FDKs) of the SST. The cover (10) is formed of polycarbonate, and includes a convex magnification portion (16) for assisting reading of on-screen text. The one-piece cover (10) is slimmer than conventional glass safety covers, and so reduces the separation between the display screen and FDKs, leading to a reduction in parallax experienced by users.

17 Claims, 1 Drawing Sheet

SECURITY SCREEN FOR SELF-SERVICE TERMINALS

BACKGROUND OF THE INVENTION

The present invention relates to self-service terminals (SSTs), such as automated teller machines (ATMs), and to security screens for use in SSTs.

Self-service terminals (SSTs) are used for a wide variety of financial and non-financial transactions which do not require human supervision. A typical SST, such as an automated teller machine (ATM), includes a screen, on which are displayed instructions or messages for the user; for example, "please insert your identification card" or "please remove your cash and receipt". Conventional SSTs also typically include a number of input keys whereby a user may enter information or instructions to the SST. One such group of keys may form a numeric keypad, by means of which the user may, for example, enter a personal identification number (PIN) in order to assert an identity, or may key in a quantity, for example, the value of a check which they are depositing.

A second group of keys is also provided on the majority of conventional SSTs, and are known as function display keys (FDKs). These keys are disposed adjacent to the sides of the display screen, and have no fixed function. Rather, at certain points in a transaction flow, the FDKs will serve different functions. At the start of a transaction, each FDK may be associated with selection of a particular service; for example, cash withdrawal; check deposit; account balance printout or display; and so on. The menu of service options will be displayed on the display screen, with an indicator line leading from the appropriate FDK to the appropriate descriptive text.

However, as the FDKs and the text on the display screen are not coplanar, many observers will experience a parallax effect: particularly when a very tall or very short individual attempts to use the SST, the FDKs may not align with the appropriate on-screen text, and there is thus a risk of the user selecting the wrong function.

This parallax effect is further exacerbated by the use of toughened security screens to protect the display screens. In order to reduce the risk of vandalism or accidental damage to the display screens, toughened safety glass or similar materials are placed in front of the screen. In order that the surface of the safety glass may lie flush with the fascia of the SST, the display screen must be recessed into the fascia, so placing the display screen further from the associated FDKs.

In addition, the interface between the SST fascia adjacent the FDKs and the security screen must be sealed to prevent moisture or other undesirable elements passing into the interior of the SST. Thus a typical security screen is provided with a sealing gasket between a flange extending from the edge of the security screen and the SST fascia, the flange also serving to mount the security screen in the fascia. However, the provision of the flange and seal further increases the depth of the security screen, and increases parallax problems.

SUMMARY OF THE INVENTION

It is among the objects of embodiments of the present invention to alleviate these and other disadvantages of conventional SSTs and security screens.

According to a first aspect of the present invention, there is provided a security screen for a self-service terminal (SST) having a fascia including a display screen and a plurality of keys adjacent the screen, the security screen comprising a unitary panel for location over the display screen and the keys and forming part of the terminal fascia, the panel having a protective light transmitting portion for location over the display screen and defining a plurality of apertures for accommodating the keys.

Such a security screen thus provides a single panel which may cover both the display screen and the adjacent FDKs. Thus, any sealing gasket mounting flanges may be located beyond the FDKs, and so the separation between the display screen and the FDKs along the line of sight of users may be reduced. Parallax is therefore reduced when such a panel is used. As the light transmitting portion is protective (that is, made of solid material) it reduces the possibility of the display screen (located behind the protective portion) being vandalized.

Preferably, the portion of the rear face of the panel to be placed over the display screen is recessed with respect to the portion of the panel to be placed over the keys. This enables the display screen itself to be located close to level with the keys, so further reducing parallax.

Preferably, the panel is formed from a plastics material.

Preferably, the panel is formed from a molded material. Alternatively the panel may be cast or machined.

Preferably, the panel is molded polycarbonate.

Preferably, the panel is of translucent material. Most preferably, the panel is of transparent material. In a preferred embodiment, the rear surface of the portion of the panel to be located over the keys is rendered opaque. Conveniently this is achieved by use of a paint coating; alternative means may of course be used, for example, etching, frosting, or staining, or the provision of an intermediate opaque sheet or film of appropriate configuration.

Preferably, at least a portion of the outer surface of the panel is convex or of some other form to provide a magnification effect, which makes it easier for the user to read text on the display screen behind the panel.

Preferably, the panel bears a plurality of lines leading from adjacent each respective key opening toward the area of the panel to be placed adjacent a display screen. These "leader lines" serve to draw the eye from the key to the display screen, to counterbalance any remaining parallax effect.

According to a second aspect of the present invention, there is provided a self-service terminal (SST) having a fascia including a display screen and a plurality of keys adjacent the display screen, and a security screen comprising a unitary panel for location over the display screen and the keys, and forming part of the SST fascia, the panel having a protective light transmitting portion for location over the display screen and defining a plurality of apertures for accommodating the keys.

BRIEF DESCRIPTION OF THE DRAWINGS

These and other aspects of the present invention will now be described by way of example only with reference to the accompanying figures, in which.

DETAILED DESCRIPTION

Figure 1:
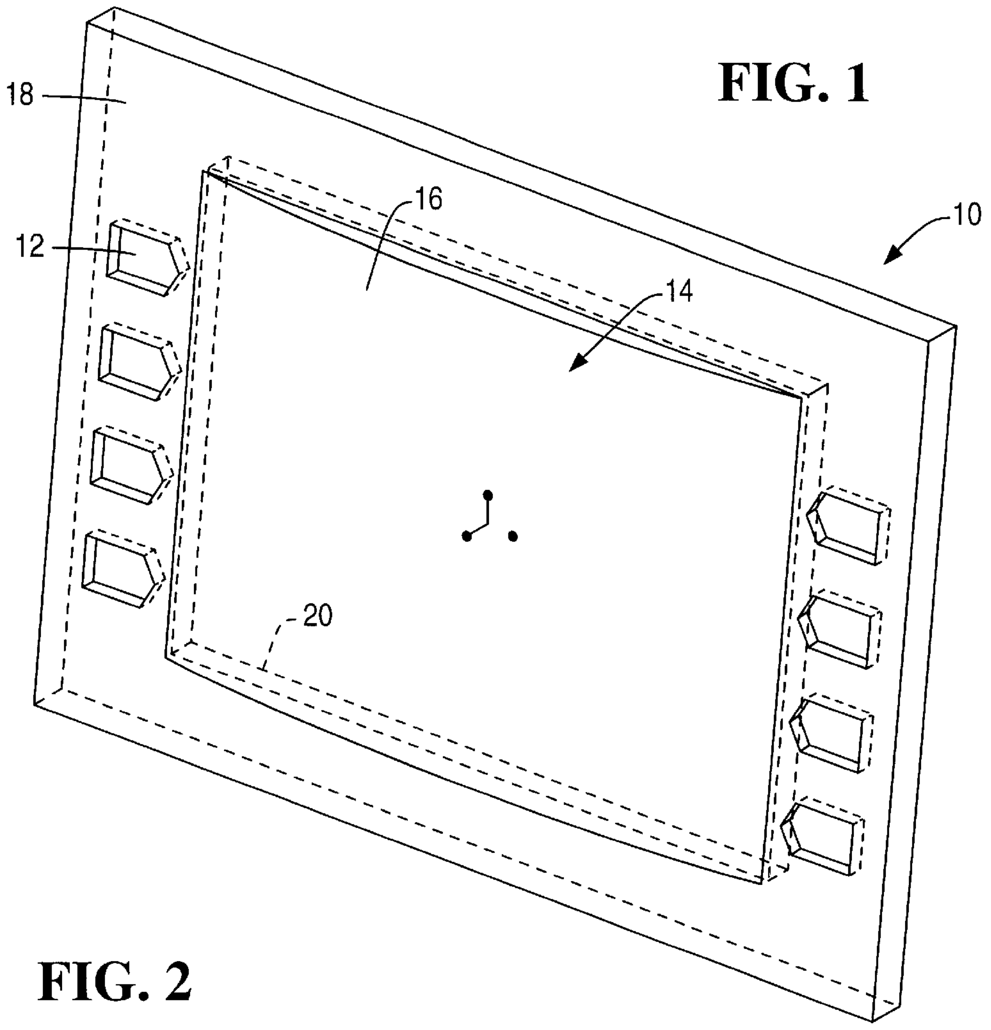
FIG. 1 shows a security cover for an SST in accordance with one embodiment of the present invention.

FIG. 1 shows a one-piece molded security cover 10, for use with a self-service terminal (SST) including a display screen and a number of function display keys (FDKs) adjacent the display screen.

The cover 10 is formed of a polycarbonate and defines a number of apertures 12 at the edges of the cover, corresponding to the FDKs on the SST.

The rear of the cover 10 defines a recess 14 which will be located over the SST display screen; this recess 14 enables the display screen to be set almost flush with the FDKs, so reducing parallax between the two.

A further reduction in parallax is provided from the cover 10 fitting over both the display screen and the FDKs: the necessary mounting flanges and sealing gaskets to secure the cover relative to the SST fascia and to prevent moisture ingress may be placed around the periphery of the cover, thereby enabling the FDKs and screen to be substantially coplanar.

The front portion of the cover includes a convex portion 16, to be located over the display screen. This portion 16 acts as a magnifying lens, thereby assisting individuals with poorer vision to perceive text or other information shown on the display screen.

The rear surface of the cover 10 carries a layer of opaque paint on that portion 18 which frames or surrounds the display screen. This has the effect and appearance of "marking out" the display screen, and serves to conceal the areas surrounding the FDKs from a user.

Figure 2:
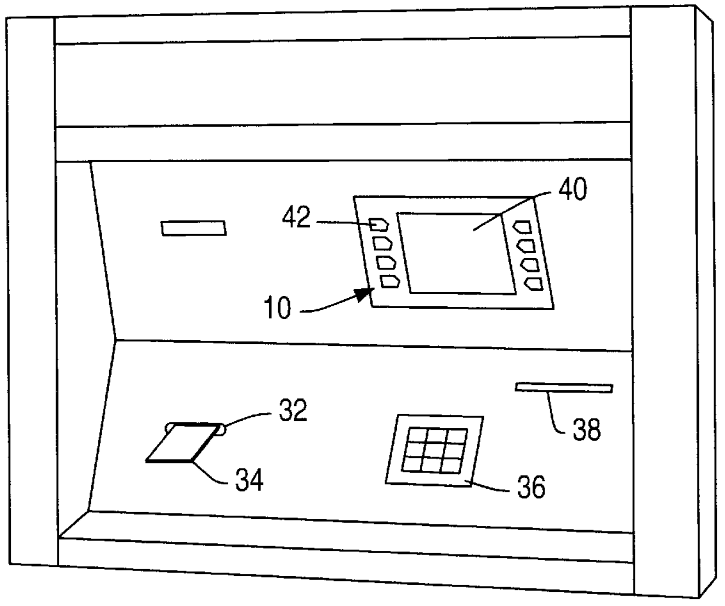
FIG. 2 shows a self-service terminal (SST) incorporating the security cover of FIG. 1.

FIG. 2 shows the fascia of a self-service terminal (SST) 30 including a magnetic card reader slot 32, in which a magnetic identification card 36 may be inserted, a numeric keypad 36, and a media dispense slot 38. The SST 30 further includes a display screen 40 with a number of adjacent function display keys (FDKs) 42, over both of with is located the security screen 10 as illustrated in FIG. 1.

It may be seen that the security cover 10 may be substantially thinner than conventional glass covers, and thereby reduces the problem of parallax experienced by some users of SSTs.

It will be appreciated that the molded security cover of the above embodiment has a low manufacturing and assembly cost compared with the security screen and gasket arrangements used in the prior art.

It will also be apparent to those of skill in the art that the above-described embodiment is merely exemplary of the present invention and that various modifications and improvements may be made thereto without departing from the scope of the invention.

What is claimed is:

1. A security screen for a self-service terminal having a fascia including a display screen and a plurality of keys adjacent the screen, the security screen comprising:

a unitary panel for location over the display screen and the keys and forming part of the terminal fascia, the panel including (i) a protective light transmitting portion, which portion is constructed of a solid transparent material, for location over the display screen and (ii) means defining a plurality of apertures for accommodating the keys.

2. A screen of claim 1, wherein a portion of a rear face of the panel to be placed over the display screen is recessed with respect to a portion of the panel to be placed over the keys.

3. A screen of claim 2, wherein the panel comprises translucent material.

4. A screen of claim 3, wherein a rear surface of the portion of the panel to be located over the keys is rendered opaque.

5. A screen of claim 1, wherein the panel comprises a plastics material.

6. A screen of claim 1, wherein the panel comprises a molded material.

7. A screen of claim 6, wherein the panel comprises molded polycarbonate.

8. A screen of claim 1, wherein the panel includes means for providing a magnification effect.

9. A self-service terminal comprising:

a fascia including a display screen and a plurality of keys adjacent the display screen; and a security screen forming part of the fascia and including a unitary panel for location over the display screen and the keys, the panel including (i) a protective light transmitting portion, constructed of a solid material, for location over the display screen and (ii) means defining a plurality of apertures for accommodating the keys.

10. A self-service terminal of claim 9, wherein a portion of a rear face of the panel to be placed over the display screen is recessed with respect to a portion of the panel to be placed over the keys.

11. A self-service terminal of claim 10, wherein the panel comprises translucent material.

12. A self-service terminal of claim 9, wherein a rear surface of the portion of the panel to be located over the keys is rendered opaque.

13. A self-service terminal of claim 9, wherein the panel comprises a plastics material.

14. A self-service terminal of claim 9, wherein the panel comprises a molded material.

15. A self-service terminal of claim 14, wherein the panel comprises molded polycarbonate.

16. A self-service terminal of claim 9, wherein the panel includes means for providing a magnification effect.

17. For an Automated Teller Machine, which comprises a display and input keys, the improvement comprising:

a) a sheet of plastic material, which includes:

i) a transparent region, and ii) opaque regions adjacent the transparent region; and b) a plurality of apertures within the opaque regions, positioned such that the input keys extend through the apertures when the transparent region is positioned over the display.

* * * * *